(12) United States Patent  (10) Patent No.: US 8,879,099 B2
Mogaki  (45) Date of Patent: Nov. 4, 2014

(54) PRINTING SYSTEM AND METHOD INCLUDING AUTHENTICATION AND OWNER NAME ACQUISITION

(75) Inventor: Shunsuke Mogaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 13/398,240

(22) Filed: Feb. 16, 2012

(65) Prior Publication Data

US 2012/0229838 A1    Sep. 13, 2012

(30) Foreign Application Priority Data

Mar. 8, 2011   (JP) ................................. 2011-050704

(51) Int. Cl.
  *G06F 3/12*     (2006.01)
  *G06F 21/60*    (2013.01)
  *G06K 15/00*    (2006.01)
  *G06F 21/00*    (2013.01)
  *H04L 29/06*    (2006.01)

(52) U.S. Cl.
  CPC ............ *G06F 21/608* (2013.01); *G06F 3/1238* (2013.01); *H04L 63/0807* (2013.01); *G06F 3/1222* (2013.01); *G06F 3/1287* (2013.01); *G06F 3/1288* (2013.01); *G06F 3/1265* (2013.01); *G06F 3/1204* (2013.01); *G06F 3/1272* (2013.01)
  USPC .......................... 358/1.15; 358/1.14; 713/182

(58) Field of Classification Search
  USPC .......................... 358/1.15, 473, 1.14; 713/182
  See application file for complete search history.

(56) References Cited

U.S. PATENT DOCUMENTS

| | | | | |
|---|---|---|---|---|
| 5,802,260 | A  * | 9/1998 | Shimakawa et al. | 358/1.15 |
| 8,006,293 | B2 * | 8/2011 | Zhang et al. | 726/8 |
| 8,189,220 | B2 * | 5/2012 | Subramanian | 358/1.15 |
| 2002/0114013 | A1* | 8/2002 | Hyakutake et al. | 358/3.28 |
| 2004/0190049 | A1* | 9/2004 | Itoh | 358/1.15 |
| 2005/0254070 | A1* | 11/2005 | Sayama | 358/1.1 |
| 2006/0028679 | A1* | 2/2006 | Uchiyama et al. | 358/1.15 |
| 2006/0077429 | A1* | 4/2006 | Zhang et al. | 358/1.15 |

(Continued)

FOREIGN PATENT DOCUMENTS

| | | |
|---|---|---|
| CN | 1614529 A | 5/2005 |
| JP | 11-282804 A | 10/1999 |
| JP | 2003-271331 A | 9/2003 |

OTHER PUBLICATIONS

Chinese Office Action issued in corresponding application No. 201210057214.3 on Aug. 22, 2014.

*Primary Examiner* — Houshang Safaipour
*Assistant Examiner* — Walter Yehl
(74) *Attorney, Agent, or Firm* — Carter, DeLuca, Farrell & Schmidt, LLP

(57) ABSTRACT

A print server comprises: unit configured to acquire an owner name of a user for specifying the user in an output apparatus, the owner name being set in advance in correspondence with user information of the user who issues the print instruction in the print server and being to be set in a print job to be processed by the output apparatus; and unit configured to, when the acquisition unit has acquired the owner name, generate a print job in which the acquired owner name is set as an owner name of the print job, and when the owner name has been neither set nor acquired, generate a print job in which a user name designated in the user information of the user in the print server is set as the owner name of the print job.

2 Claims, 13 Drawing Sheets

(56) References Cited

U.S. PATENT DOCUMENTS

| | | | |
|---|---|---|---|
| 2006/0077434 A1* | 4/2006 | Zhang et al. | 358/1.15 |
| 2006/0077437 A1* | 4/2006 | Lovat et al. | 358/1.15 |
| 2006/0077438 A1* | 4/2006 | Lovat et al. | 358/1.15 |
| 2006/0119883 A1* | 6/2006 | Lovat et al. | 358/1.15 |
| 2008/0297829 A1* | 12/2008 | Paek | 358/1.15 |
| 2009/0002733 A1* | 1/2009 | Kakigi | 358/1.9 |
| 2009/0248632 A1* | 10/2009 | Subramanian | 707/3 |
| 2009/0251724 A1* | 10/2009 | Nakajima | 358/1.15 |
| 2010/0245901 A1* | 9/2010 | Kitaguchi | 358/1.15 |
| 2010/0290081 A1* | 11/2010 | Uchida | 358/1.15 |
| 2011/0001999 A1* | 1/2011 | Nanaumi | 358/1.14 |

\* cited by examiner

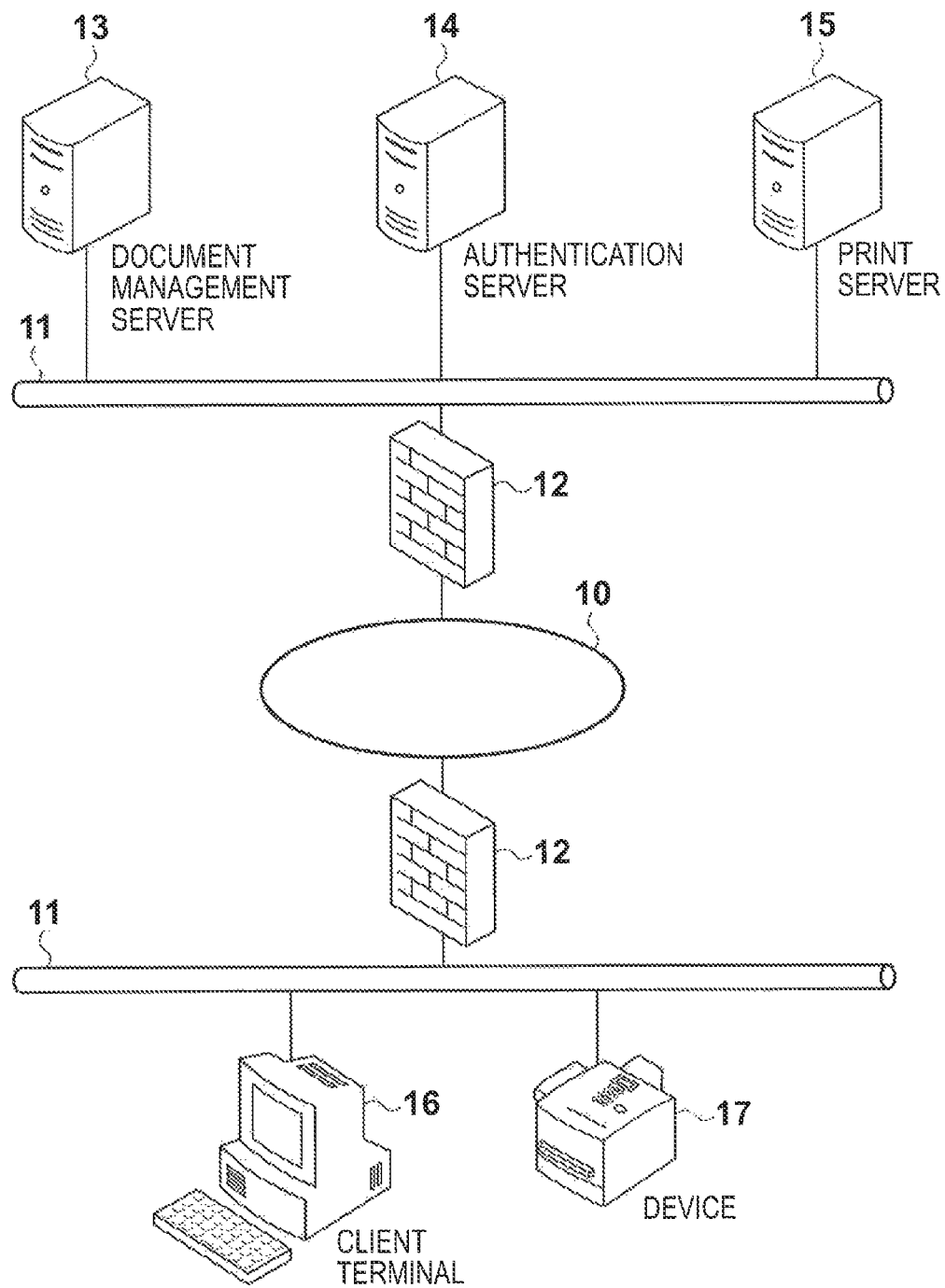

FIG. 9A

| USER ID | OWNER NAME | DEVICE |
|---|---|---|
| AAA | XXX | DEVICE 1 |
| AAA | YYY | DEVICE 2 |
| BBB | ZZZ | DEVICE 1 |
| ... | ... | ... |

FIG. 9B

| USER ID | AUTHENTICATION TOKEN | EXPIRATION DATE |
|---|---|---|
| AAA | SID12345ABCD | xxxxx |
| AAA | SIDWXYZ56789 | yyyyy |
| BBB | SID3456EFGHI | xxxxx |
| ... | ... | ... |

FIG. 9C

| MANAGED USER ID | USER ID AT COOPERATION DESTINATION |
|---|---|
| AAA | USER1 |
| BBB | USER2 |
| ... | ... |

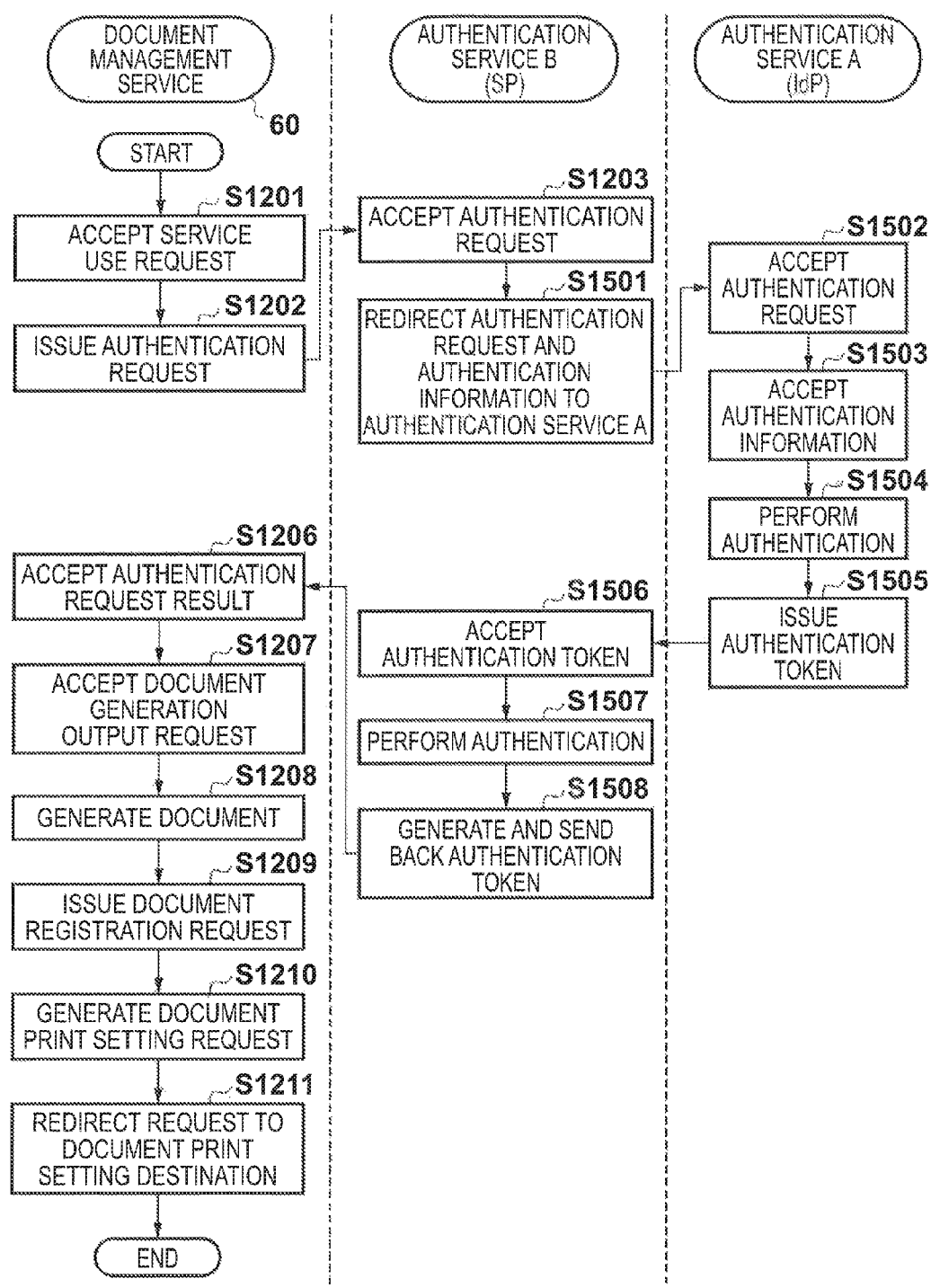

PRINTING SYSTEM AND METHOD INCLUDING AUTHENTICATION AND OWNER NAME ACQUISITION

BACKGROUND OF THE INVENTION

1. Field of the Invention

The present invention relates to a print server, a printing system, a control method, and a computer-readable medium. Especially, the present invention relates to a method of setting a job owner name when generating a print job in a printing system in which a print job is registered from a print server in a printer belonging to another network via the Internet.

2. Description of the Related Art

Recently, the business of providing services on the Internet as cloud services is expanding. Cooperation between a plurality of services enhances a service function. A plurality of services cooperate with each other using SSO (Single Sign-On) which allows a user to use a plurality of systems and applications only once he is authenticated.

One form for implementing SSO is a system configured by an IdP (Identify Provider) which performs centralized management of authentication, and a SP (Service Provider) which trusts authentication information by the IdP and provides services. With SSO of this form, the user can utilize services after he is authenticated by the IdP. When using respective SPs, the user needs to log in to the respective SPs using login IDs managed in the respective SPs and to be registered in all services.

Japanese Patent Lard-Open No. 11-282804 discloses a system which trusts authentication information in an authentication server and performs authentication cooperation. When a Web service is accessed, the Web service redirects the access to the authentication server, and the authentication server performs authentication. If the authentication is successful, the authentication server issues a certificate of authentication. After the certificate issued by the authentication server is transferred to a cooperative Web service, the Web service authenticates the user using the certificate without acquiring authentication information from him.

Along with the recent trend of cloud services, a Web service may provide a print job. When the Web service adopts a mechanism such as SSO mentioned above, a user requires at least two user IDs, that is, a user ID for using a Web service which provides a print job, and a user ID for using a printer. At this time, the two user IDs may be different. In this case, when generating a print job in a print service, a job owner name different from a user name used to log in to the printer is generated. For example, the printer does not have a mechanism of managing a print job generated, by the Web service and the user of the Web service in association with each other. Hence, a job of the user who has utilized the Web service cannot be confirmed from the management screen of the printer.

SUMMARY OF THE INVENTION

According to one aspect of the present invention, there is provided a print server which generates a print job in accordance with a print instruction from a user, comprising: an acquisition unit configured to acquire an owner name of the user for specifying the user in an output apparatus, the owner name being set in advance in correspondence with user information of the user who issues the print instruction in the print server and being to be set in a print job to be processed by the output apparatus; and a generation unit configured to, when the acquisition unit has acquired the owner name, generate a print job in which the acquired owner name is set as an owner name of the print job, and when the owner name has been neither set nor acquired, generate a print job in which a user name designated in the user information of the user in the print server is set as the owner name of the print job.

According to another aspect of the present invention, there is provided a printing system comprising a print server which generates a print job in accordance with a print instruction from a user, an authentication server which performs authentication processing, and an output apparatus which performs output based on the print job, the authentication server including a register unit configured to register, in a storage unit, user information in the print server and user information in the output apparatus in correspondence with each other, and the print server including: an acquisition unit configured to acquire, from the authentication server, an owner name of the user for specifying the user in the output apparatus, the owner name being set in advance in correspondence with user information of the user who issues the print instruction in the print server and being to be set in a print job to be executed by the output apparatus; and a generation unit configured to, when the acquisition unit has acquired the owner name, generate a print job in which the acquired owner name is set as an owner name of the print job, and when the owner name has been neither set nor acquired, generate a print job in which a user name designated in the user information of the user in the print server is set as the owner name of the print job.

According to another aspect of the present invention, there is provided a method of controlling a print server which generates a print job in accordance with a print instruction from a user, comprising: acquiring an owner name of the user for specifying the user in an output apparatus, the owner name being set in advance in correspondence with user information of the user who issues the print instruction in the print server and being to be set in a print job to be processed by the output apparatus; and when the owner name has been acquired in the acquiring an owner name, generating a print job in which the acquired owner name is set as an owner name of the print job, and when the owner name has been neither set nor acquired, generating a print job in which a user name designated in the user information of the user in the print server is set as the owner name of the print job.

According to another aspect of the present invention, there is provided a method of controlling a printing system including a print server which generates a print job in accordance with a print instruction from a user, an authentication server which performs authentication processing, and an output apparatus which performs output based on the print job, comprising: in the authentication server, registering, in a storage unit, user information in the print server and user information in the output apparatus in correspondence with each other, and in the print server, acquiring, from the authentication server, an owner name of the user for specifying the user in the output apparatus, the owner name being set in advance in correspondence with user information of the user who issues the print instruction in the print server and being to be set in a print job to be processed by the output apparatus; and when the owner name has been acquired in the acquiring an owner name, generating a print job in which the acquired owner name is set as an owner name of the print job, and when the owner name has been neither set nor acquired, generating a print job in which a user name designated in the user information of the user in the print server is set as the owner name of the print job.

According to another aspect of the present invention, there is provided a non-transitory computer-readable medium storing a program for causing a computer to function as an acquisition unit configured to acquire an owner name of the user for specifying the user in an output apparatus, the owner name being set in advance in correspondence with user information of a user who issues a print instruction in the computer and being to be set in a print job to be processed by the output apparatus, and a generation unit configured to, when the acquisition unit has acquired the owner name, generate a print job in which the acquired owner name is set as an owner name of the print job, and when the owner name has been neither set nor acquired, generate a print job in which a user name designated in the user information, of the user in the computer is set as the owner name of the print job.

According to another aspect of the present invention, there is provided a printing system comprising a document management server, an authentication server, and a print server, the document management server including a first transmission unit configured to, when the document management server is accessed, from an unauthenticated client terminal, transmit a redirect instruction to the client terminal to cause the client terminal to access the authentication server, the authentication server including: an authentication unit configured to request authentication information of the client terminal which has accessed the authentication server in accordance with the redirect instruction transmitted from the first transmission unit, perform authentication based on the authentication information transmitted in response to the request, and when the authentication has succeeded, generate an authentication token; a storage unit configured to store a user ID of a user who operates the client, terminal, in association with a user ID common between the document management, server, the authentication server, and the print server, and the authentication token generated by the authentication unit; and a second transmission unit configured to transmit a redirect instruction to cause the client terminal to access the document management server, and the authentication token to the client terminal, the document management server further including: a register unit configured to register information of document data containing the user ID of the user who operates the client terminal, in the print server in response to acquiring the authentication token from the client terminal which has accessed the document management server in accordance with the redirect instruction transmitted from the second transmission unit; and a third transmission unit configured to transmit a redirect instruction to cause the client terminal to access the print server, and the authentication token to the client terminal, and the print server including: a conversion unit configured to acquire the user ID stored in association with the authentication token in response to acquiring the authentication token from the client terminal which has accessed the print server in accordance with the redirect instruction transmitted, from the third transmission unit, acquire document data managed in the document management server in response to coincidence between the acquired user ID and the user ID registered by the register unit, and convert the document data into data of a printing format; a request unit, configured, to request the client terminal to transmit the authentication token to a printing apparatus; and a fourth transmission unit configured to transmit the data of the printing format converted by the conversion unit to the printing apparatus in response to acquiring, by the client terminal from the printing apparatus in accordance with the request from the request unit, the authentication token transmitted to the printing apparatus.

According to another aspect of the present invention, there is provided a method of controlling a printing system including a document management server, an authentication server, and a print server, comprising: in the document management server, when the document management server is accessed from an unauthenticated client terminal, transmitting a redirect instruction to the client terminal to cause the client terminal to access the authentication server, in the authentication server, requesting authentication information of the client terminal which has accessed the authentication server in accordance with the redirect instruction transmitted in the transmitting a redirect instruction to the client terminal, performing authentication based on the authentication information transmitted, in response to the request, and when the authentication has succeeded, generating an authentication token; storing a user ID of a user who operates the client terminal, in a storage unit in association with a user ID common between the document management server, the authentication server, and the print server, and the authentication token generated in the requesting authentication information; and transmitting a redirect instruction to cause the client terminal to access the document management server, and the authentication token to the client terminal, in the document management server, registering information of document data containing the user ID of the user who operates the client terminal, in the print server in response to acquiring the authentication token from the client terminal which has accessed the document management server in accordance with the redirect instruction transmitted in the transmitting a redirect instruction to cause the client terminal to access the document management server; and transmitting a redirect instruction to cause the client terminal to access the print server, and the authentication token to the client terminal, and in the print server, acquiring the user ID stored in association with the authentication token in response to acquiring the authentication token from the client terminal which has accessed the print server in accordance with the redirect instruction transmitted in the transmitting a redirect instruction to cause the client terminal to access the print server, acquiring document data managed in the document management server in response to coincidence between the acquired user ID and the user ID registered in the registering information of document data, and converting the document data into data of a printing format; requesting the client terminal to transmit the authentication token to a printing apparatus; and transmitting the data of the printing format converted in the acquiring the user ID, to the printing apparatus in response to acquiring, by the client terminal from the printing apparatus in accordance with the request in the requesting the client terminal to transmit the authentication token, the authentication token transmitted to the printing apparatus.

The present invention can make the owner name of a print job created by each service coincide with a user name on a printer while reducing the burden imposed by an increase/decrease in the number of cooperative services in a system in which a plurality of services having different user names cooperate with each other.

Further features of the present invention will become apparent from the following description of exemplary embodiments (with reference to the attached drawings).

BRIEF DESCRIPTION OF THE DRAWINGS

FIG. 1 is a block diagram showing the arrangement of a printing system;

FIGS. 9A, 9B, and 9C are tables each exemplifying a data structure managed on the authentication service;

FIG. 14 is a flowchart showing authentication processing in SSO cooperation according to the second embodiment.

DESCRIPTION OF THE EMBODIMENTS

Figure 2A:
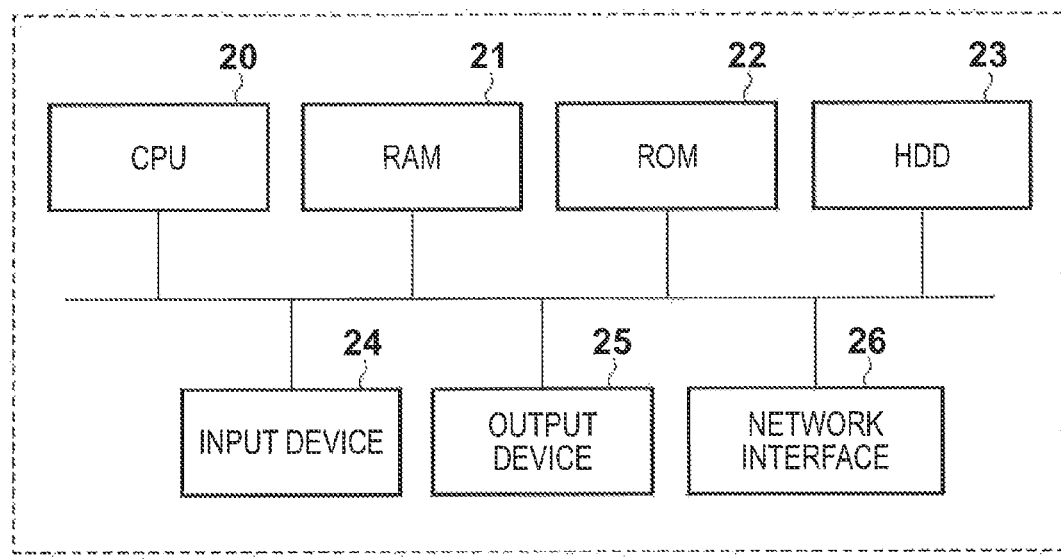
FIGS. 2A and 2B are block diagrams showing the hardware arrangements of respective apparatuses which form the printing system.

Embodiments of the present invention will now be described with reference to the accompanying drawings.

[System Arrangement]

FIG. 1 is a block diagram showing the arrangement of a printing system according to an embodiment. In the printing system, a WWW (World Wide Web) system is built, in a WAN (Wide Area Network) 10 serving as an external network. LANs 11 connect the building components of the system in respective internal networks. Firewalls 12 are interposed between the WAN 10 and the LANs 11, and control communicable data in consideration of security between the networks.

A client terminal 16 issues a Web request to each server via the LAN 11 and WAN 10. Further, the client terminal 16 includes a Web browser capable of browsing data provided by each server. A document management server 13 generates document data in response to a Web request from the client terminal 16. Document data managed by the document management server 13 may be held in it or another document management server. In response to a Web request from the client terminal 16, an authentication server 14 authenticates a user who operates the client terminal 16. In response to a Web request from the client terminal 16, a print server 15 manages printing of designated document data by a designated printer. A device 17 prints document data. Various kinds of information about the device 17 are registered in the print server 15. Examples of the device 17 are a printer and an MFP (Multi Function Peripheral) having the print function. Note that each server is formed from one apparatus, but may be a server group formed from a plurality of apparatuses. In the embodiment, even a server group which is formed from a plurality of apparatuses and provides one function (service) will be called a server.

[Hardware Arrangement]

Figure 2B:
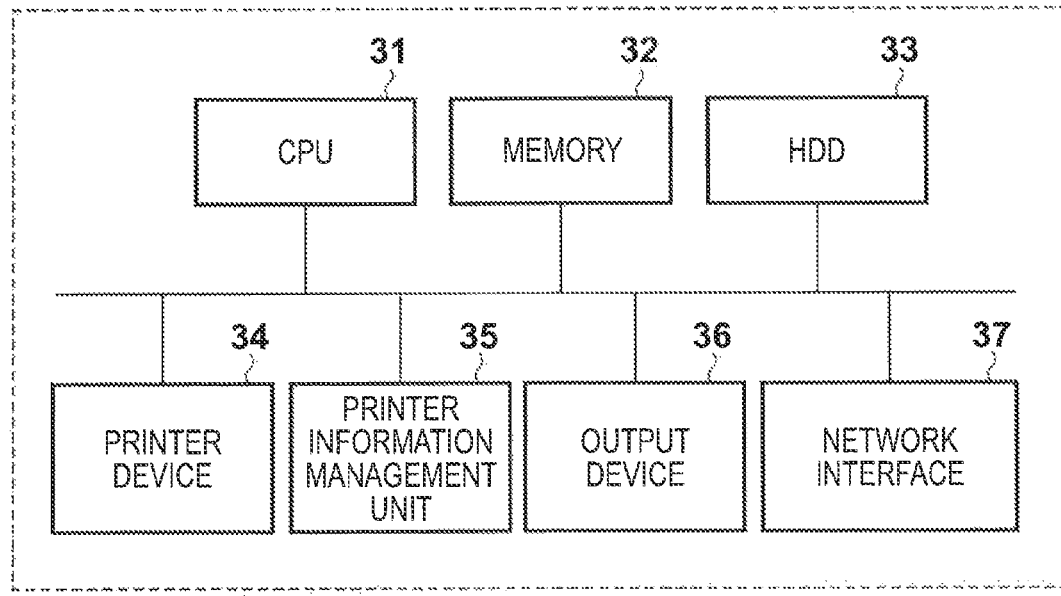

FIG. 2A is a block diagram showing the hardware arrangement of the document, management server 13, authentication server 14, print server 15, and client terminal 16 shown in FIG. 1. FIG. 2E is a block diagram showing the hardware arrangement of the device 17 shown in FIG. 1. The hardware arrangements shown in FIGS. 2A and 2B correspond to those of a general information processing apparatus and output device. Hence, each of the apparatuses in the embodiment is not limited to the above arrangement, and the hardware arrangements of a general information processing apparatus and output device are applicable.

Referring to FIG. 2A, a CPU 20 executes programs such as an OS (Operating System) and applications which are stored in a ROM 22 or HDD 23 serving as a storage unit and loaded into a RAM 21. The processing of each flowchart (to be described later) can be implemented by executing the program. The RAM 21 functions as a main memory, work area, and the like for the CPU 20. An input device 24 includes, for example, a keyboard and pointing device, and accepts an input from the user. An output device 25 includes various displays, and displays processing results and the like. The HDD 23 is an external memory which stores various data, for example, a permanent storage such as a hard disk or flash memory. A network interface 26 is connected to a network such as the LAN 11, and executes communication control processing with another network-connected device.

Referring to FIG. 2E, a CPU 31 is connected to each function/apparatus (to be described later) via an internal bus, and controls the device 17. An output device 36 provides an operation touch panel and the like. In the embodiment, the user performs a manipulation via a screen displayed on the output device 36 to achieve an operation the user wants. A printer device 34 is a printing unit. A printer information management unit 35 manages/holds the function/status of the printer device 34.

Further, a memory 32 stores various instructions (including an application program) to be executed to control the device 17 by the CPU 31. An HDD 33 temporarily stores data to be printed by the printer device 34. A network interface 37 transmits/receives signals via a network under the control of the CPU 31.

[Software Configuration]

Figure 3:
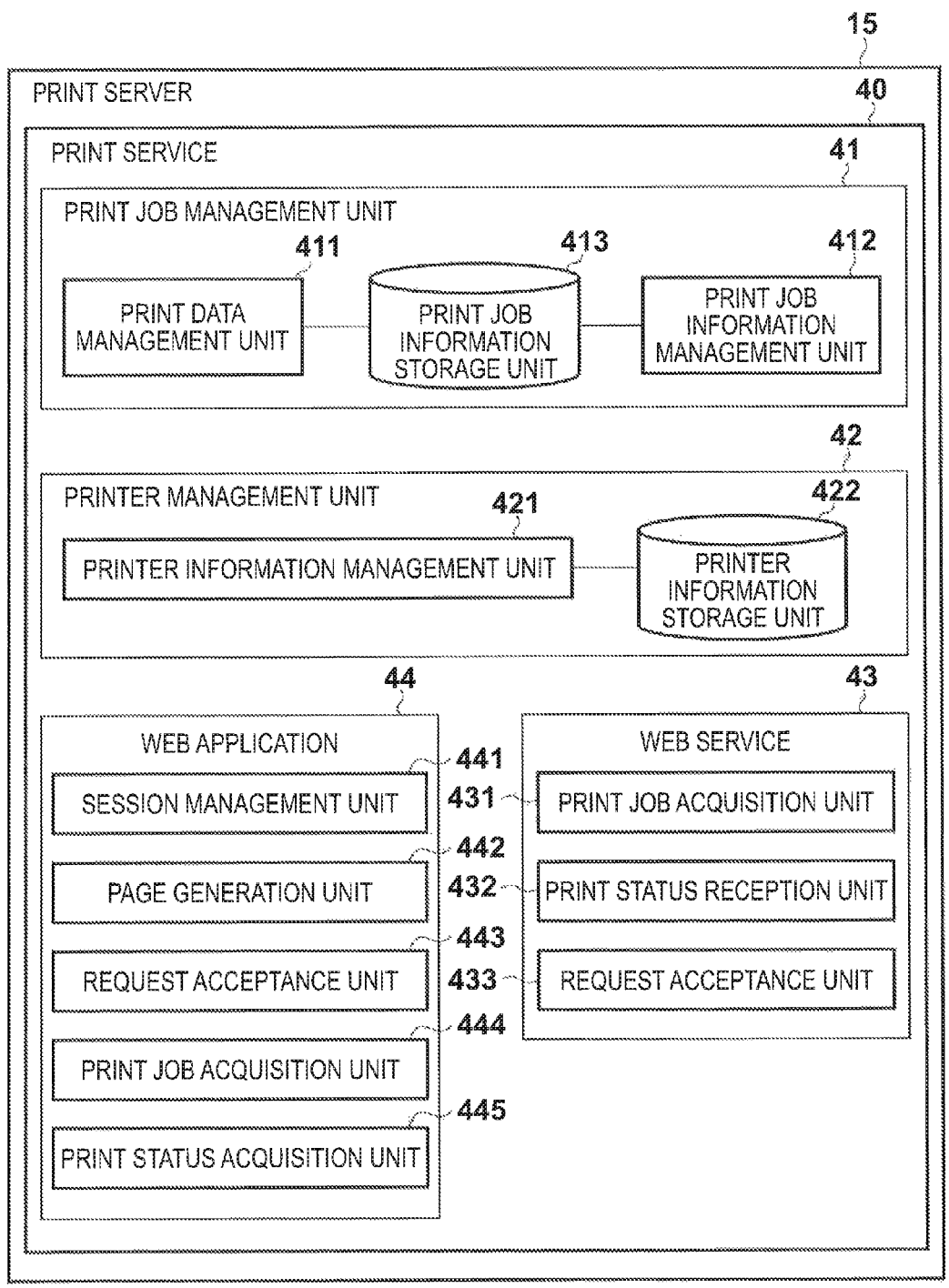
FIG. 3 is a block diagram showing the configuration of software modules regarding a print service.

FIG. 3 is a block diagram showing the configuration of the software modules of a print service 40 running on the print server 15 according to the embodiment. A print job management unit 41 manages print data. Upon receiving a print data acquisition request from a Web application 44 or Web service 43, a print data management unit 411 acquires and sends back print data which is held in a print job information storage unit 413 and designated by the print data acquisition request. A print job information management unit 412 manages print job information of print data held in the print job information storage unit 413.

The job information used is formed from information including a job owner name, a job identification ID for identifying print data, a document name, a job type for identifying a data format, a print status, an acceptance date & time, a final print date & time, a page count, a page size, and a print data link destination. The print status in the job information includes statuses such as "standby", "during transfer", "during printing", "during cancellation", "normal end", "cancellation end", and "error end". A printer information management unit 421 in a printer management unit 42 manages printer information held in a printer information storage unit 422.

The Web application 44 includes a session management unit 441, page generation unit 442, request acceptance unit 443, print job acquisition unit 444, and print status acquisition unit 445. The session management unit 441 manages, as a session, a request for which authentication is successful in an authentication service 50. The page generation unit 442 generates and sends back a Web page in response to a request received from the Web browser. The request acceptance unit 443 accepts a print request, print job acquisition request, printer control request, print job status, and the like from the Web browser. When the request acceptance unit 443 accepts a print request or print job acquisition request, the print job acquisition unit 444 transmits a print data acquisition request to the print job management unit 41. When the request acceptance unit 443 accepts a print job status, the print status acquisition unit 445 notifies the print job management unit 41 of the received status.

The Web service 43 includes a print job acquisition unit 431, print status reception unit 432, and request acceptance unit 433. The request acceptance unit 433 receives a print job acquisition request or print job status from an external service or application, and transfers it to each unit. When the request acceptance unit 433 receives a print job acquisition request, the print job acquisition unit 431 transmits the print data acquisition request to the print job management unit 41. When the request acceptance unit 433 receives the print job status, the print status reception unit 432 notifies the print job management unit 41 of the received status.

In other words, the print service 40 includes two processing units, that is, the Web application 44 which accepts a request from the Web browser, and the Web service 43 from an external service or application.

Figure 4:
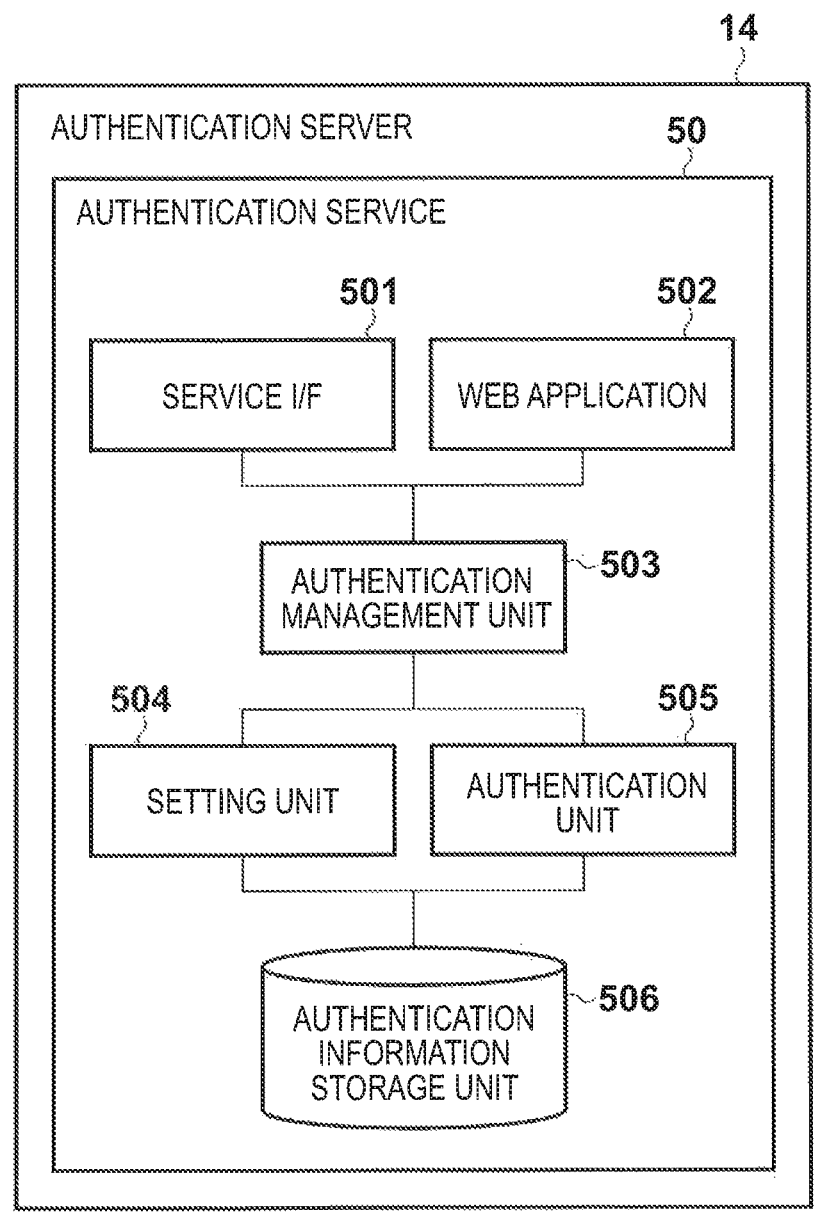
FIG. 4 is a block diagram showing the configuration of software modules regarding an authentication service.

FIG. 4 is a block diagram showing the configuration of the software modules of the authentication service 50 running on the authentication server 14. A service interface (I/F) 501 is an interface module which receives a request from an external service and transmits a request to another service. Requests to be accepted by the service I/F 501 include a request to acquire user information, and a user authentication request. The service I/F 501 transmits an accepted request to an authentication management unit 503.

A Web application 502 is an application having an interface for accepting a request from the Web browser. The Web application 502 receives an authentication request from the Web browser of the client terminal 16 or device 17, and issues an authentication request to the authentication management unit 503. As an example of the authentication method used here, the Web application 502 responds by creating an authentication screen or responds without generating sin authentication screen. The Web application 502 generates even user information registration and change screens (not shown), and the like.

The authentication management unit 503 performs processing in response to a request received from the service I/F 501 or Web application 502. Upon receiving an authentication request, the authentication management unit 503 issues an authentication request to an authentication unit 505. In addition, the authentication management unit 503 causes the authentication unit 505 to confirm authentication information, and if the authentication information is confirmed, issues an authentication setting request to a setting unit 504. The authentication request is a request to register/change authentication information (for example, user ID and password) of each user that is held in an authentication information storage unit 506.

Upon receiving the authentication setting request from the authentication management unit 503, the setting unit 504 sets and changes authentication information held in the authentication information storage unit 506. In the embodiment, the authentication information storage unit 506 stores pieces of information shown in FIGS. 8A and 9A to 9C. In response to the authentication setting request from the authentication management unit 503, the setting unit 504 sets and changes user information shown in FIG. 8A, the owner name and device information shown in FIG. 9A, and the like.

Upon receiving the authentication request from the authentication management unit 503, the authentication unit 505 performs authentication based on the authentication logic and information in the authentication information storage unit 506. If the authentication is successful, the authentication unit 505 generates an authentication token. The authentication information storage unit 506 manages the generated authentication token, as shown in FIG. 9B. The generated authentication token is transmitted as a response to the requesting source via the service I/F 501 or Web application 502.

Figure 5:
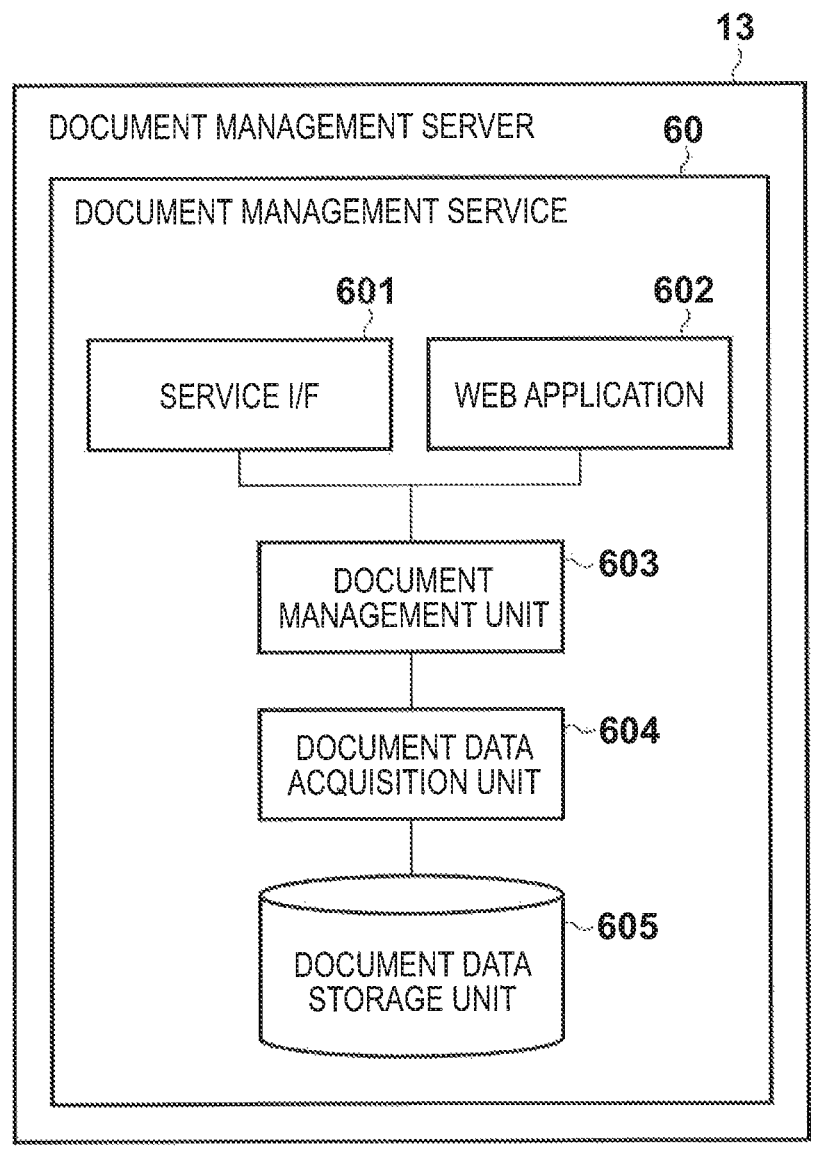
FIG. 5 is a block diagram showing the configuration of software modules regarding a document management service.

FIG. 5 is a block diagram showing the configuration of the software modules of a document management service 60 running on the document management server 13. A service I/F 601 is an interface module which outputs a created document to another service. A Web application 602 is an application having an interface for accepting a request from the browser. The Web application 602 generates and sends back a screen (not shown) used to request generation or output of a document in response to a request from the Web browser of the client terminal 16. Upon receiving a document generation request, the Web application 602 issues the document generation request to a document management unit 603. The document generation request is a request to create document data to be transmitted to the client terminal 16 using data held in a document data storage unit 605.

Upon receiving the document generation request, the document management unit 603 acquires document information from the document data storage unit 605 via a document data acquisition unit 604, and generates a document. Then, the document management unit 603 sends back the generated document data to the requesting source. In document generation, the document management unit 603 can acquire document data from another service (not shown) via the service I/F 601, as needed. Note that document generation processing is processing of generating a form type document from document data.

Figure 6:
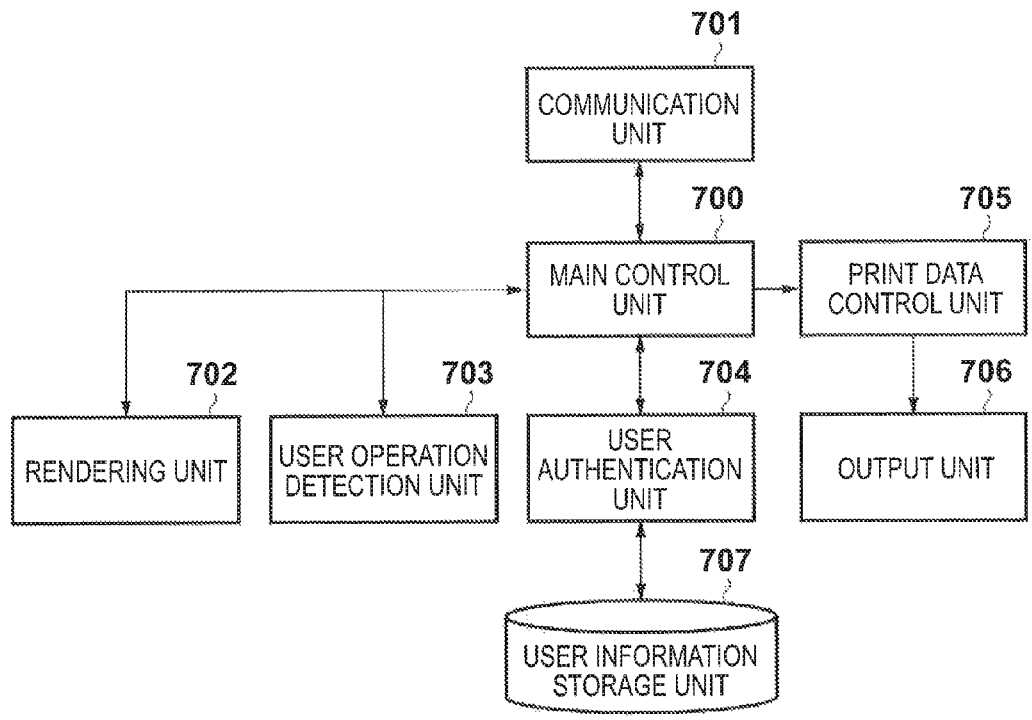
FIG. 6 is a block diagram showing the configuration of the software modules of a device.

FIG. 6 is a block diagram showing the configuration of software modules for controlling the device 17 according to the embodiment. A main control unit 700 controls the overall system of the device according to the embodiment. The main control unit 700 issues instructions to respective units (to be described later) and manages the respective units. The main control unit 700 generates communication data to access an external service, and transfers it to a communication unit 701. Assume that external services accessed by the main control unit 700 are the Web application 44 and Web service 43 in the print service 40.

The communication unit 701 is connected to an external service in accordance with an instruction from the main control unit 700, and transmits a request generated by the main control unit 700. The communication unit 701 receives a response result to the transmitted request. A rendering unit 702 receives an instruction from the main control unit 700, and displays a character string on the output device 36. A user operation detection unit 703 receives an input from the output device 36, and transfers the input information to the main control unit 700.

A user authentication unit 704 receives an instruction from the main control unit 700 and performs authentication processing regarding the user of the device 17. More specifically, upon receiving an authentication request from the main control unit 700, the user authentication unit 704 performs authentication using information held in a user information storage unit 707. At this time, the user authentication unit 704 can acquire authentication information from another service (not shown), as needed. Even for the same user (operator), the device 17 and various services may manage authentication information of the user at different locations in different formats. In this case, authentication information in the device 17 and that in the authentication service 50 may differ from each other.

A print data control unit 705 receives an instruction from the main control unit 700, and converts it into a print instruction based on print data received by the communication unit 701. An output unit 706 sequentially executes print instructions transferred from the print data control unit 705, and outputs the results from the printer device 34.

Figure 7:
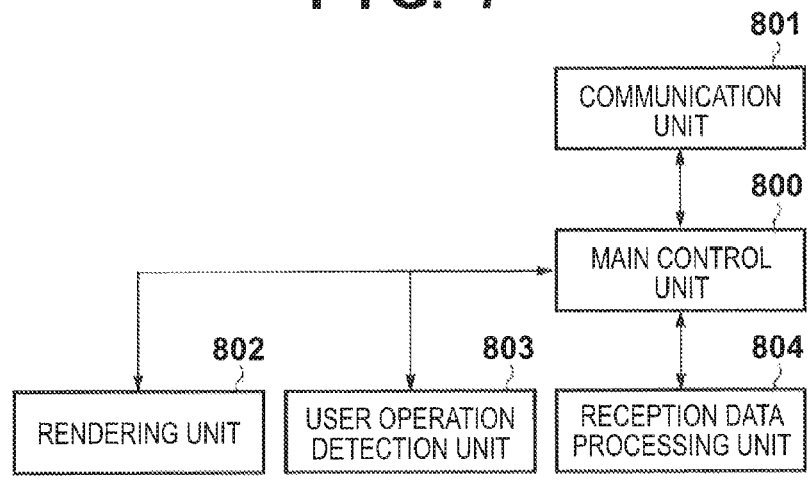
FIG. 7 is a block diagram showing the configuration of the software modules of a client terminal.

FIG. 7 is a block diagram showing the configuration of software running on the client terminal 16 according to the embodiment. A main control unit 800 controls the overall software on the client terminal 16 to call, execute, and control each component, and transfer data between components. A communication unit 801 transmits a request via the network interface 26 based on an instruction from the main control unit 800. The communication unit 801 receives information via the network interface 26 as a response to the transmitted request, and transfers it to the main control unit 800.

A rendering unit 802 interprets and renders information received from the main control unit 800. A user operation detection unit 803 receives an input from the input device 24, and transfers the input information to the main control unit 800. A reception data processing unit 804 accepts an instruction from the main control unit 800. The reception data processing unit 804 interprets the contents of information received by the communication unit 801, and converts the information into an instruction based on the designated contents. Then, the reception data processing unit 804 sends back the converted instruction to the main control unit 800.

Note that the building components and data sets shown in FIGS. 3 to 7 are expressed by logically dividing them into respective functions, but need not always be physically divided and may be implemented by the same part.

[Data Structure]

Figure 8A:
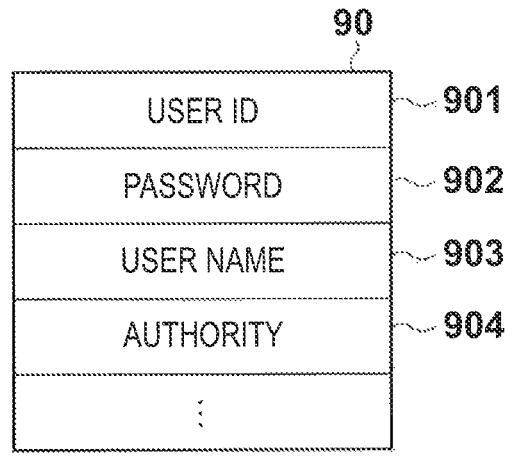
FIGS. 8A, 8B, and 8C are views each exemplifying a data structure used in the authentication service.

FIG. 8A exemplifies the data structure of user information 90 managed on the authentication service 50. As the user information 90, a user TD 901, a password 902, a user name 903 such as a login name used for display, user authority 904, and another information are managed. As the authority 904, user authority to an external service such as the print service 40 which cooperates with the authentication service 50 is also managed in addition to user authority on the authentication service 50.

Figure 8B:
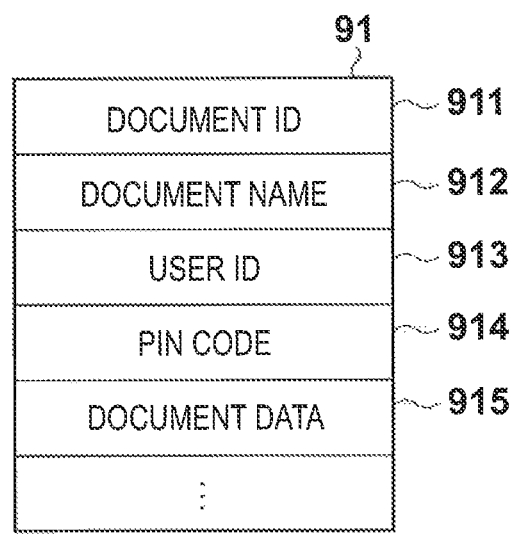

FIG. 8B exemplifies the data structure of document information 91 managed on the print service 40. The document information 91 includes a document ID 911 for specifying a document, a document name 912 serving as the display name of the document, a user ID 913 serving as the user ID of the creator of the document, a PIN code 914 for specifying the document, document data 915, and another information. The device 17 recognizes the user ID 913 as the job owner name of a print job. Note that the document data 915 may be configured so that document data is stored in the binary format. It is also possible to store document data itself in another area and store information indicating the path of the storage location.

Figure 8C:
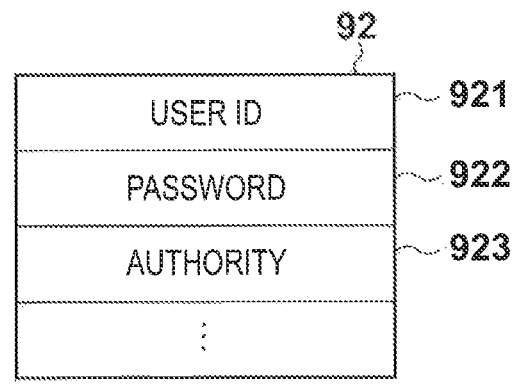

FIG. 8C exemplifies the data structure of user information 92 managed on the device 17. As the user information 92 in the device 17, a user ID 921, password 922, user authority 923, and another information are managed.

The location (apparatus) where user information is managed differs between the user ID 901 shown in FIG. 8A which is managed in the authentication service 50, and the user ID 921 shown in FIG. 8C which is managed in the device 17. Thus, even the same user (operator) may have different user IDs. Needless to say, the same user ID may be used. When registering the document information 91 in the print service 40, the same contents as those of the user ID 901 managed in the authentication service 50 are set for the user ID 913 shown in FIG. 8B which is managed in the print service 40.

[Data Management Structure]

FIG. 9A exemplifies management of user information and the owner name on the authentication service 50. For the user ID 901 in the user information shown in FIG. 8A, a corresponding device, and an owner name corresponding to the user ID used in the device are managed. The managed device information is information capable of uniquely specifying a device, such as the IP address or serial number. The managed owner name is registered, as a job owner name when generating a print job on the print service 40 or the like. For the owner name shown in FIG. 9A, the same contents as those of the user ID 921 shown in FIG. 8C that are managed in the device 17 are desirably registered, but different contents may be registered. As a feature, the embodiment can cope with a case in which different contents are registered in the authentication service 50 and device 17.

FIG. 9B exemplifies management of an authentication token issued on the authentication service 50. A successfully authenticated user, an authentication token issued in correspondence with the user, and the expiration date of the authentication token are managed in correspondence with each other.

FIG. 9C exemplifies management of corresponding authentication information when a plurality of services cooperate with each other using SSO. A user ID managed on the authentication service 50 and a user ID managed on an authentication service at the SSO cooperation destination are managed in association with each other. SSO cooperation indicates that a provider formed from an SP and IdP integrally executes authentication of respective services (for example, cloud service). Note that, the information shown in FIG. 9C will be described in detail in the second embodiment.

[Owner Name Setting Request Processing Sequence]

The processing sequence of each service according to the embodiment will be explained with reference to a flowchart. The following flowchart assumes that the authentication service 50 integrally performs user management of the document management service 60 and print service 40. An authentication unit (not shown) in the device 17 or the like performs user management of the device 17 independently of the integral authentication processing by the authentication service 50. For this reason, the login ID is different between the authentication service 50 and the device 17. That is, the user ID 901 of the authentication service 50 and the user ID 921 of the device 17 differ from each other. The embodiment assumes that the print service 40, authentication service 50, and document management service 60 use a common user ID.

Figure 10:
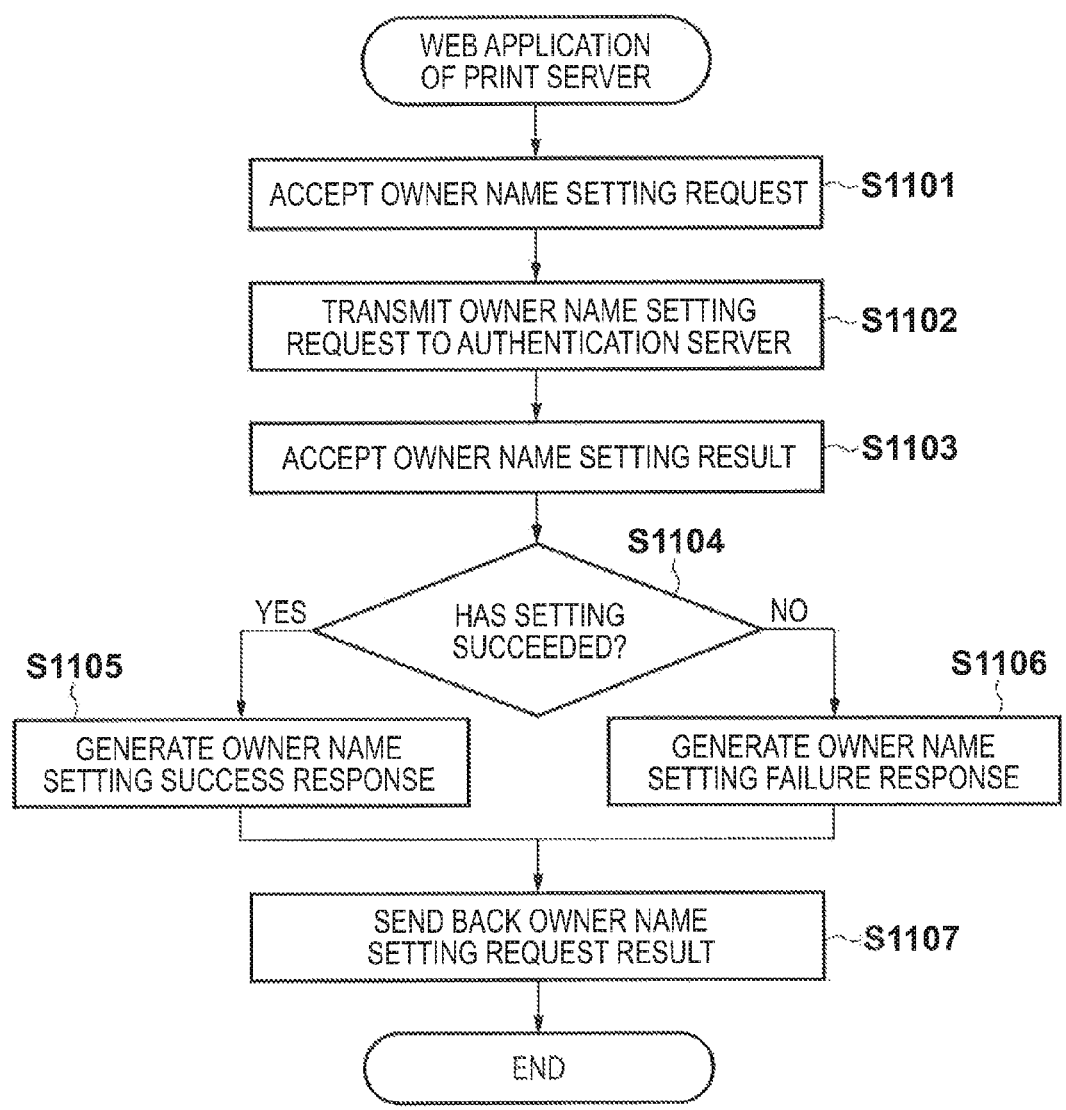
FIG. 10 is a flowchart showing owner name setting processing in the print service.

FIG. 10 shows a sequence which is executed by the print service 40 to set an owner name corresponding to the user of the print service 40. The processing sequence shown in FIG. 10 is executed when the user of the print service 40 has already been registered in the authentication service 50 or when newly registering a user in the authentication service 50. In the embodiment, the following processing is implemented by executing a program stored in a RAM or the like serving as a storage unit by the CPU of the print server 15.

When the print service 40 receives an owner name setting request from the outside, the Web application 44 transmits the owner name setting request to the authentication service 50 provided by the authentication server 14 (steps S1101 and S1102). The received owner name setting request contains information of an owner name corresponding to the user. The owner name information corresponds to the user ID 921 held in the device 17, and is designated by the user. At this time, the setting unit 504 of the authentication service 50 performs user setting in response to the owner name setting request from the print service 40. In step S1103, the Web application 44 accepts the setting result. The Web application 44 refers to the received setting result, and if the owner name setting has succeeded (YES in step S1104), generates a success response from the authentication service 50 (step S1105). If the owner name setting has failed (NO in step S1104), the Web application 44 generates a failure response (step S1106). In step S1107, the Web application 44 sends back the owner name setting result to the transmission source of the owner name setting request received in step S1101. Note that the owner name to be set desirably has the same contents as those of the login name of the user of the print service 40 to the device 17, but different contents can also be set.

[Cooperation Processing Sequence]

Figure 11:
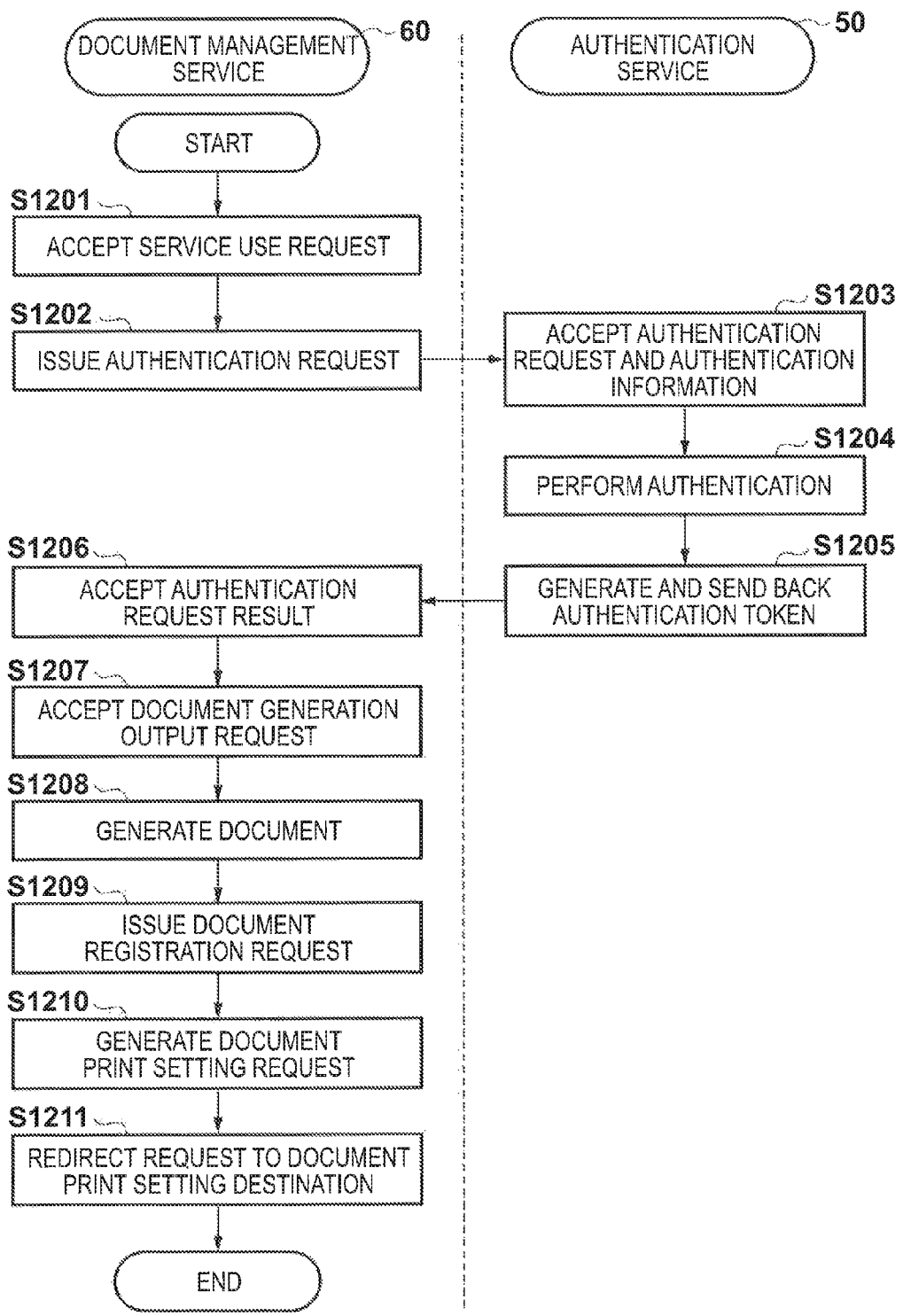
FIG. 11 is a flowchart showing authentication processing for the document management service.

FIG. 11 shows a processing sequence when the document management service 60 requests authentication of the authentication service 50 and cooperates with an external service. The document management service 60 is accessed from a Web browser on the client terminal 16. In the embodiment, the following processing is implemented by executing a program stored in a RAM or the like serving as a storage unit by the CPU of each server.

The document management service 60 receives a document management service use request from the client terminal 16, and issues an authentication request to the authentication service 50 (steps S1201 and S1202). The authentication management unit 503 of the authentication service 50 accepts the authentication request via the service I/F 501, and receives authentication information from the document management service 60 via the service I/F 501 (step S1203). The authentication unit 505 performs user authentication using the received authentication information and user information stored in the authentication information storage unit 506 (step S1204). The authentication information is one input via the client terminal 16.

If the authentication has succeeded, the authentication management unit 503 generates an authentication token, and sends back the generated authentication token to the authentication request source via the service I/F 501 (step S1205). The generated authentication token is, for example, session information such as a session ID, or an OAuth token. A one-time password character string or random character string is also usable. Assume that the authentication token has a time limit and can be used till the time limit. The generated authentication token is stored in the authentication information storage unit 506 in a format as shown in FIG. 9B. If the authentication has failed in step S1204, the authentication management unit 503 notifies the authentication request source of a message to this effect.

The document management service 60 receives the authentication token transmitted from the authentication server in step S1206. Then, the document management service 60 receives a document generation output request from the client terminal 16, and generates a form type document from the document data (steps S1207 and S1208). After the end of document generation, the document management service 60 issues a document registration request to an external service (step S1209). The external service is, for example, the print service 40. The document registration request contains the user ID and the ID of the generated document.

The document management service 60 generates a document print setting request, and redirects it to a cooperative service via the client terminal 16 (steps S1210 and S1211). At this time, the document management service 60 sends, to the cooperation destination, even the authentication token received in step S1206. In the embodiment, the cooperation destination is the print service 40.

Note that the document management service 60 may perform authentication different from that in FIG. 11. For example, authentication may be executed according to the following sequence, instead of steps S1201 to S1206 of FIG. 11. The document management service 60 redirects access to it from the client terminal 16 by issuing a redirect instruction to the authentication service 50, and causes the authentication service 50 to execute authentication (first transmission unit). At this time, the client terminal 16 has not been authenticated because it does not have an authentication token. The authentication service 50 transmits an authentication screen to the accessing client terminal 16 in accordance with the redirect instruction from the document management service 60. The authentication service 50 acquires authentication information input by the user via the authentication screen. After the authentication service 50 performs authentication based on the acquired authentication information, the client terminal 16 acquires an authentication token upon authentication success by the authentication service 50, and transfers the authentication token to the document management service 60. At this time, the authentication server 14 holds the issued authentication token in correspondence with the user ID. Processing of accessing again the document management service 60 by the client terminal 16 which has succeeded in authentication is implemented by giving a redirect instruction for the document management service 60 from the authentication service 50 to the client terminal 16 which has acquired the authentication token (second transmission unit). In the second transmission unit, the authentication service 50 may transmit an authentication token to the client terminal 16 together with the redirect instruction to transmit the authentication token to the document management service 60.

Upon acquiring the authentication token from the client terminal 16, the document management service 60 acquires a login session from the authentication service 50 based on the authentication token. Based on the acquired login session, the document management service 60 determines that authentication has been performed. In other words, even the document management service 60 may authenticate access based on the authentication token, similar to the Web application 44 of the print server 15 (to be described later).

Processes in step S1207 and subsequent steps are the same as those in FIG. 11. In all processes of the present invention, authentication is executed by exchanging authentication tokens. Even the document registration request in step S1209 can be issued by setting the user ID in the login session.

Note that the document management service 60 transmits a redirect instruction to the client terminal 16 and shares an authentication token in steps S1210 and S1211 in order to cooperate with the print service 40 (third transmission unit). In the third transmission unit, the document management service 60 may transmit an authentication token to the client terminal 16 together with the redirect instruction to transmit the authentication token to the print service 40.

Figure 12:
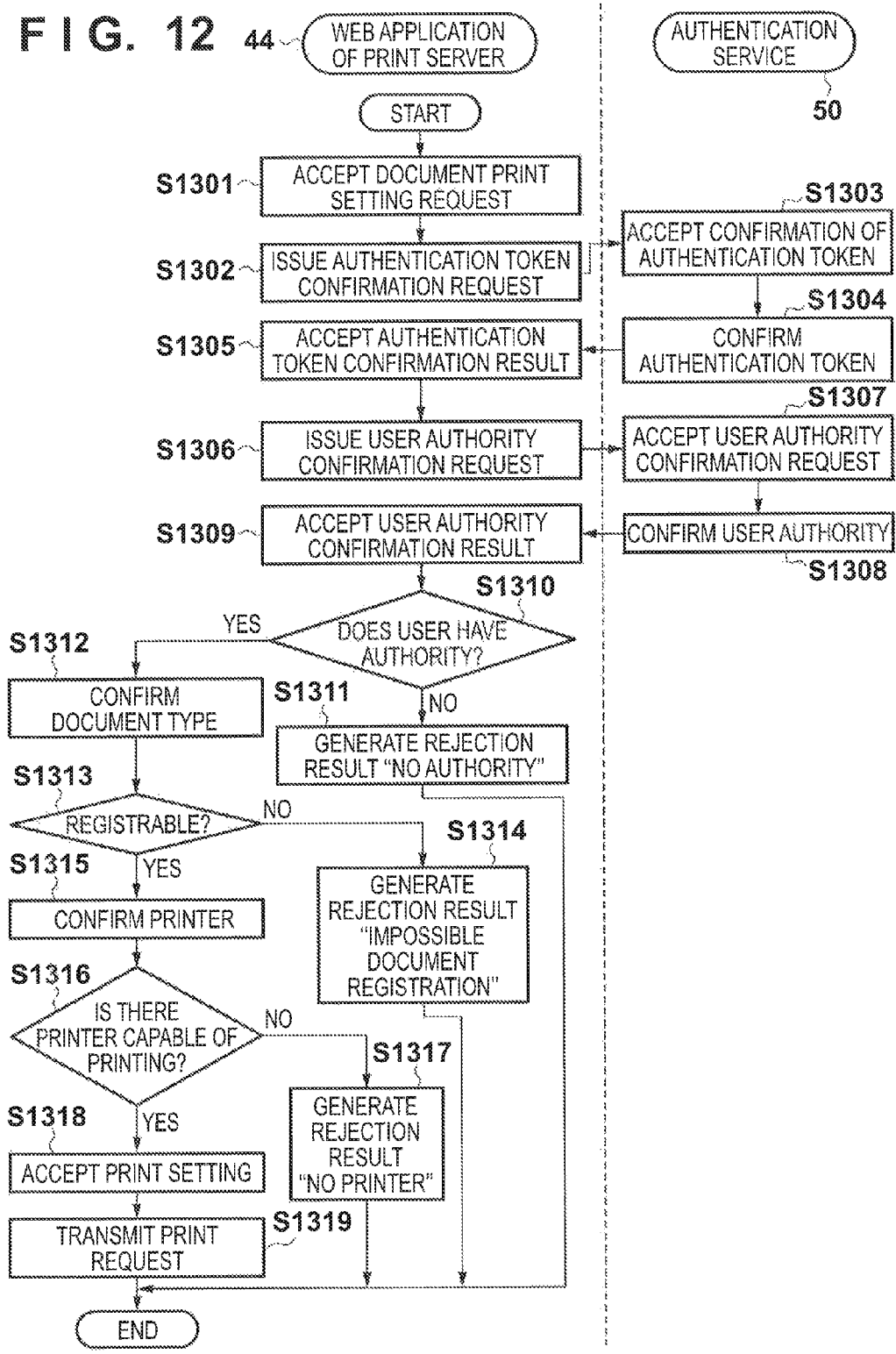
FIG. 12 is a flowchart showing authority confirmation processing en the print service.

FIG. 12 shows a processing sequence when the print service 40 receives a print instruction from an external service. The flowchart shown in FIG. 12 is executed after step S1211 of FIG. 11. In the embodiment, the following processing is implemented by executing a program stored in a RAM or the like serving as a storage unit by the CPU of each server.

The print service 40 accepts a document print setting request from an external service such as the document management service 60, and requests the authentication service 50 to confirm an authentication token received together with the document print setting request (steps S1301 and S1302). The authentication management unit 503 of the authentication service 50 receives the authentication token via the service I/F 501, and then the authentication unit 505 confirms the authentication token. Based on information in the authentication information storage unit 506, the authentication unit 505 determines whether the received authentication token is correct (steps S1303 and S1304). Whether the received authentication token is correct is determined using, for example, the ID and time limit of the authentication token that are held in the authentication information storage unit 506, as shown in FIG. 9B.

If the authentication service 50 determines that the authentication token is correct, the print service 40 issues again a request to the authentication service 50 to confirm the authority of the user who has issued the print setting request (steps S1305 and S1306). The authentication service 50 sends back authority information of the user in response to the received confirmation request (steps S1307 and S1308). The sent-back authority information is the authority 904 shown in FIG. 8A. Based on the authority information transmitted from the authentication service 50, the print service 40 determines whether the user who has issued the print setting request has authority to execute the processing (steps S1308 and S1310). In this confirmation processing, it is confirmed whether a user ID in the document registration request registered by the document management service 60 in step S1209 coincides with a user ID acquired from the authentication service 50 based on the acquisition token.

If the user who has issued the print setting request does not have authority (NO in step S1310), the print service 40 generates a setting rejection result "no authority" in step S1311. If the user has authority (YES in step S1310), the print service 40 confirms whether the type of registration-requested document is registrable (steps S1312 and S1313). Whether the document can be registered is determined based on type information (for example, file type) set for each document. Note that this information is defined in the document information 91 shown in FIG. 8B. If the type of document is not registrable (NO in step S1313), the print service 40 generates a setting rejection result "impossible document registration" (step S1314). If the type of document is registrable (YES in step S1313), the print service 40 confirms a printer usable by the user (steps S1315 and S1316). This printer is the device 17. The confirmation processing is performed based on the use authority of the user, the state of connection to each printer, or the like. As the authority to use the printer by the user, user information and an available printer are stored in association with each other and can be used. The document is acquired based on a document ID contained in a document registration request registered by the document management service 60 in step S1209. The Web application 44 of the print service 40 acquires form type document data from the document management service 60 based on the document ID.

If there is no usable printer (NO in step S1316), the print service 40 generates a setting rejection result "no printer" (step S1317). If there is a usable printer (YES in step S1316), the print service 40 accepts print settings from the Web browser and transmits a print request to the device 17 (steps S1318 and S1319). At this time, the print service 40 transmits even an authentication token to the device 17. Note that the client terminal 16 may issue a request to transmit an authentication token (request unit), instead of transmitting a print request and authentication token from the print service 40.

Figure 13:
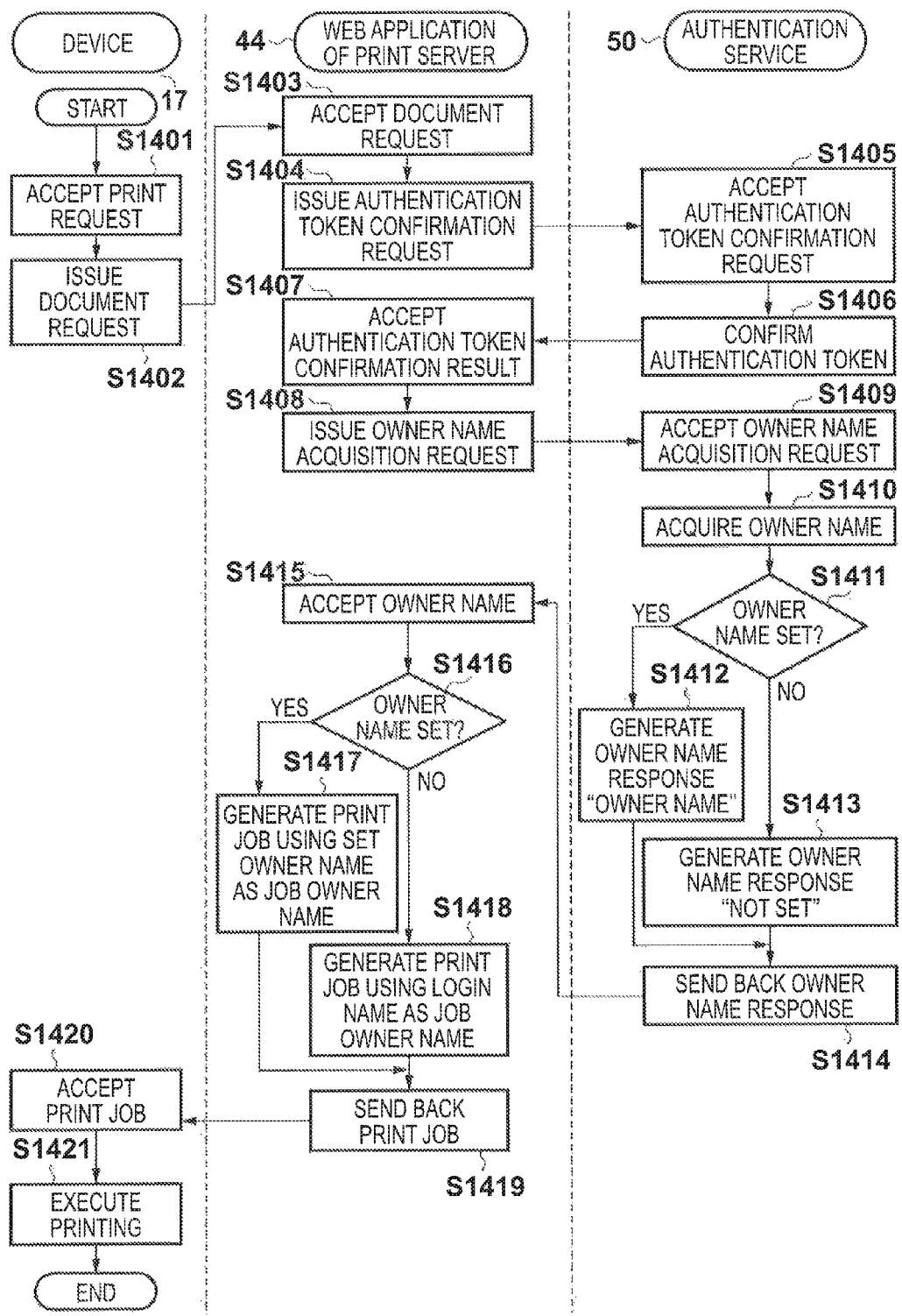
FIG. 13 is a flowchart showing print processing.

FIG. 13 shows a processing sequence to acquire a print job from the print service 40 by the device 17 which has received a print request from the print service 40, and print. The flowchart shown in FIG. 13 is executed after step S1319 of FIG. 12. In the embodiment, the following processing is implemented by executing a program stored in a RAM or the like serving as a storage unit by the CPU of each server.

The device 17 receives a print request from the print service 40, and issues a document request to the print service 40 (steps S1401 and S1402). The print service 40 issues a document request to request a document (print job) corresponding to the received print request. At the same time, the print service 40 transmits an authentication token. The print service 40 receives the document request from the device 17, and transmits a request to the authentication service 50 to confirm the authentication token received from the device 17 (steps S1403 and S1404). The authentication service 50 confirms the validity of the authentication token in accordance with the authentication token confirmation request received from the print service 40, and determines whether the user has been authenticated (steps S1405 and S1406). As described with reference to FIG. 9B, the authentication service 50 makes the determination using information (for example, time limit) stored in the authentication information storage unit 506. The authentication service 50 sends back the authentication result (for example, user ID and device name) to the print service 40.

If the authentication service 50 confirms that the authentication token is valid, the print service 40 transmits a request to the authentication service 50 to acquire the owner name of a user who has issued the authentication token to the authentication service 50 (steps S1407 and S1408). The transmitted owner name acquisition request uses an authentication result containing the user ID, device name, and the like corresponding to the owner name.

Upon receiving the owner name acquisition request from the print service 40 in step S1409, the authentication management unit 503 of the authentication service 50 acquires an owner name set for the user from the authentication information storage unit 506 via the authentication unit 505 (steps S1410 and S1411). At this time, the authentication unit 505 acquires, from the table shown in FIG. 9A that is held in the authentication information storage unit 506, an owner name corresponding to the user ID of the user who has issued the owner name acquisition request. At this time, if an owner name corresponding to the user ID has been set (YES in step S1411), the authentication service 50 creates a response with the set owner name (step S1412). If an owner name corresponding to the user ID has not been set (KG in step S1411), the authentication service 50 creates a response with an owner name "not set" (step S1413). After that, the authentication service 50 sends back the created response to the print service 40 in step S1414.

The print service 40 receives the response to the owner name acquisition request from the authentication service 50, and confirms the owner name (steps S1415 and S1416). If an owner name corresponding to the user ID has been set (YES in step S1416), the print service 40 generates a print job using the set owner name as a job owner name (step S1417). If an owner name corresponding to the user ID has not been set (NO in step S1416), the print service 40 generates a print job corresponding to the printing format of the device 17 using, as a job owner name, a user name for which the authentication token has been issued (that is, the user ID in the print service 40) (step S1418). The print service 40 sends back the generated print job to the device 17 (step S1419). The fourth transmission unit is implemented by sending back the print job.

The device 17 receives the print job from the print service 40 in step S1420, and executes print processing in step S1421.

As described above, even when the login user name is different between the device 17 and the print service 40, the user can make user names for a job to coincide with each other without paying attention to the difference in login user name.

Second Embodiment

The second embodiment according to the present invention will be described with reference to the accompanying drawings. As the second embodiment, an arrangement in which the present invention is applied to the SSO (Single Sign-On) environment will be explained.

In a system, in which a plurality of services cooperate with each other using SSO, the respective services manage accounts, and the system needs to cope with an increase/decrease in the number of cooperative services. However, it is difficult to cope with the increase/decrease. For example, every time a service is added, settings need to be made for all managed users. At the end of the use of a service, managed user information needs to be updated.

FIG. 14 shows an authentication processing sequence when an authentication service 50 for authenticating a user who can use a document management service 60 and print service 40 serves as an SP (Service Provider), an external authentication, service serves as an IdP, and they cooperate with each other using SSO. An authentication service provided by the SP is defined as authentication service B, and an authentication service provided by the IdP is defined as authentication service A. Both authentication service A and authentication service B have the same software configuration as that of FIG. 4, and each have the authentication function. In this flowchart, SSO cooperation information shown in FIG. 9C is held on authentication service B. Note that authentication service A and authentication service B are implemented by physically different apparatuses in the embodiment, but may be implemented within a single apparatus. In the embodiment, the following processing is implemented by executing a program stored in a RAM or the like serving as a storage unit by the CPU of each server.

Processes in steps S1201 to S1203 are the same as those shown in FIG. 11 in the first embodiment. Upon receiving an authentication request from the document management service 60, authentication service B redirects the authentication request to authentication service A in step S1501 without performing authentication. At this time, authentication information is redirected, too.

Authentication service A receives the authentication request and authentication information, and performs authentication in accordance with the received authentication information (steps S1502, S1503, and S1504). In this case, the user on authentication service A is authenticated. The user ID need in this processing is "user ID at the cooperation destination" shown in FIG. 9C. If the authentication has succeeded, authentication service A issues an authentication token and transmits it to authentication service B (step S1505). The authentication token generated by authentication service A is used for SSO cooperation with authentication service B. The authentication token includes an authentication assertion such as a SAML (Security Assertion Markup Language) assertion, and information indicating an authentication state such as cookie.

Upon receiving the authentication token issued by authentication service A in step S1506, authentication service B performs authentication using the authentication token (step S1507). The authentication by authentication service B is executed for a user on authentication service B who is associated with a user authenticated by authentication service A. The user ID used here is "managed user ID" shown in FIG. 9C. That is, even if the user ID on authentication service A and that on authentication service B differ from each other, these user IDs are made to correspond to each other in the table shown in FIG. 9C, implementing 330 cooperation. Further, these user IDs are associated with even the user ID of a device 17. In this authentication processing, authentication for authentication service B is executed, without accepting authentication information such as the user ID or password from the user. Then, authentication service B determines that the authentication for authentication service B has succeeded, issues an authentication token, and transmits it to the document management service 60 (step S1508). Subsequent processes are the same as those in step S1205 and subsequent steps of FIG. 11 described in the first embodiment.

Subsequent flowcharts to be executed by the print service 40, device 17, and the like are the same as those in FIGS. 12 and 13 described in the first embodiment. Even when the first authentication is performed in authentication service A in SSO cooperation, subsequent confirmation of the authentication state and acquisition of user-information are executed for authentication service B. Thus, authentication service B serves as even the job owner name acquisition destination. Even if the number of cooperative services increases, the print job owner name can be changed without notifying another authentication service of a set owner name. Even if the number of cooperative services decreases, authentication processing can be executed without affecting another cooperative service because the owner name is not managed at a plurality of locations.

Note that the authentication sequence of another form described in the first embodiment may be applied to FIG. 14. In this case, in step S1202, the document management service 60 issues a redirect instruction to a client terminal 16 for authentication service B. Hence, the client terminal 16 issues an authentication request to authentication service B in step S1202. In step S1203, authentication service B accepts an authentication request from the client terminal 16. In step S1501, authentication service B issues a redirect instruction to the client terminal 16 for authentication service A. Upon accepting an authentication request from the client terminal 16 in step S1502, authentication service A requests authentication information of the client terminal 16. As a response, authentication service A accepts authentication information from the client terminal 16 in step S1503. In step S1504, authentication service A performs authentication based on the acquired authentication information. Note that the authentication information accepted in step S1503 is authentication information input via an authentication screen transmitted from authentication service A to the client terminal 16. In step S1505, authentication service A transmits an authentication token issued upon authentication success to the client terminal 16, and transmits even a redirect instruction to the client terminal 16 for authentication service B. In step S1506, authentication service B acquires the authentication token from the accessing client terminal 16 in accordance with the redirect instruction. Processes in step S1507 and subsequent steps are the same as those in FIG. 14.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-050704, filed Mar. 8, 2011, which is hereby incorporated by reference herein in its entirety.

What is claimed is:

1. A printing system comprising a print server which generates a print job in accordance with a print instruction from a user, an authentication server which performs authentication processing, and an output apparatus which performs output based on the print job,
the authentication server including a register unit configured to register, in a storage unit, user information in the print server and user information in the output apparatus in correspondence with each other, and
the print server including:
an acquisition unit configured to acquire, from the authentication server, an owner name of the user for specifying the user in the output apparatus, the owner name being set in advance in correspondence with user information of the user who issues the print instruction in the print server and being set in a print job to be executed by the output apparatus; and
a generation unit configured to, when the acquisition unit has acquired the owner name, generate a print job in which the acquired owner name is set as an owner name of the print job, and when the acquisition unit has acquired information which is transmitted in a case where the owner name is not set to user information in the print server preliminarily, generate a print job in which a user name designated in the user information of the user in the print server is set as the owner name of the print job,
wherein the authentication server specifies the user information in the print server after checking an authentication token, transmits the owner name to the print server if the owner name is set to the user information in the print server preliminarily, and transmits, to the print server, the information which is transmitted in a case where the owner name is not set to user information in the print server preliminarily if the owner name is not set to the user information preliminarily.

2. A method of controlling a printing system including a print server which generates a print job in accordance with a print instruction from a user, an authentication server which performs authentication processing, and an output apparatus which performs output based on the print job, comprising:
in the authentication server,
registering, in a storage unit, user information in the print server and user information in the output apparatus in correspondence with each other, and in the print server,
acquiring, from the authentication server, an owner name of the user for specifying the user in the output apparatus, the owner name being set in advance in correspondence with user information of the user who issues the print instruction in the print server and being set in a print job to be processed by the output apparatus; and
when the owner name has been acquired in the acquiring an owner name, generating a print job in which the acquired owner name is set as an owner name of the print job, and when information, which is transmitted in a case where the owner name is not set to user information in the print server preliminarily, has been acquired in the acquiring an owner name, generating a print job in which a user name designated in the user information of the user in the print server is set as the owner name of the print job,
wherein the authentication server specifies the user information in the print server after checking an authentication token, transmits the owner name to the print server if the owner name is set to the user information in the print server preliminarily, and transmits, to the print server, the information which is transmitted in a case where the owner name is not set to user information in the print server preliminarily if the owner name is not set to the user information preliminarily.

* * * * *